United States Patent [19]

Ottens et al.

[11] Patent Number: 5,494,942

[45] Date of Patent: Feb. 27, 1996

[54] PROCESS FOR PREPARING A RIGID POLYURETHANE FOAM AND LAMINATE ARTICLES THEREWITH

[75] Inventors: Andreas Ottens, Everswinkel; Peter Keller, Nordwalde; Ulrich Müller, Norderstedt, all of Germany

[73] Assignee: The Dow Chemical Company, Midland, Mich.

[21] Appl. No.: 174,554

[22] Filed: Dec. 27, 1993

[51] Int. Cl.$^6$ ............ C08J 9/08; C08J 9/14; C08G 18/10; C08G 18/48

[52] U.S. Cl. ............ 521/159; 521/108; 521/130; 521/164; 521/167; 521/170; 521/172; 521/174

[58] Field of Search ............ 521/108, 130, 521/159, 164, 167, 170, 172, 174

[56] References Cited

U.S. PATENT DOCUMENTS

| | | | |
|---|---|---|---|
| 3,728,288 | 4/1973 | Cobbs et al. | 521/51 |
| 3,960,788 | 6/1976 | Cuscurida et al. | 521/160 |
| 4,055,548 | 10/1977 | Carleton et al. | 521/159 |
| 4,102,833 | 7/1978 | Salisbury | 521/159 |
| 4,143,014 | 3/1979 | McLaughlin et al. | 521/159 |
| 4,314,034 | 2/1982 | Fulmer et al. | 521/159 |
| 4,365,025 | 12/1982 | Murch et al. | 521/159 |
| 4,478,960 | 10/1984 | Buethe et al. | 521/159 |
| 4,910,231 | 3/1990 | Pham et al. | 521/159 |
| 4,945,117 | 7/1990 | Gansen et al. | 521/99 |
| 4,972,004 | 11/1990 | Randall et al. | 521/159 |
| 5,070,115 | 12/1991 | Welte et al. | 521/173 |
| 5,071,881 | 12/1991 | Parfondry et al. | 521/128 |
| 5,089,534 | 2/1992 | Thoen et al. | 521/108 |
| 5,114,989 | 5/1992 | Elwell et al. | 521/159 |
| 5,143,941 | 9/1992 | Rossio et al. | 521/51 |
| 5,238,973 | 8/1993 | Mayer et al. | 521/159 |
| 5,270,348 | 12/1993 | Muller et al. | 521/159 |
| 5,374,667 | 12/1994 | Hinz et al. | 521/159 |

FOREIGN PATENT DOCUMENTS 2044526  12/1991  Canada.

OTHER PUBLICATIONS

Othmer; Encyclopedia of Chemical Technology, Third Edition; vol. 11, 1980, pp. 87–89.

*Primary Examiner*—James J. Seidleck
*Assistant Examiner*—Rabon Sergent

[57] ABSTRACT

Rigid polyurethane foam and laminate articles comprising a facing material and the said polyurethane foam are prepared by contacting under reaction conditions a urethane-modified polyisocyanate with a polyahl in the presence of a blowing agent comprising water. The urethane-modified polyisocyanate has an isocyanate content of from about 10 to about 29 weight percent and is obtained by reacting a polymethylene polyphenylisocyanate with a polyether polyol having a molecular weight of at least 2000 and an oxyethylene content of at least 35 weight percent. Use of this polyisocyanate provides for enhanced adhesion of the resulting foam, especially when it is an all-water blown foam, to facing materials such as metal.

15 Claims, No Drawings

PROCESS FOR PREPARING A RIGID POLYURETHANE FOAM AND LAMINATE ARTICLES THEREWITH

BACKGROUND OF THE INVENTION

This invention relates to a process for preparing a rigid polyurethane foam, and a laminate article containing such foam, from a urethane-modified polyisocyanate.

Rigid polyurethane foam is extensively used in the appliance and construction industry where its attractive thermal insulation performance is valued. Unfortunately as such rigid polyurethane foam frequently can be friable it is often necessary to protect it from physical damage by use of a protective facing material. The selection of suitable facing material is generally application related and can be for appliance units, a plastic; for rigid insulation boardstock, paper; or for refrigerated containers or roadstock, metal. End products comprising a facing material and rigid polyurethane foam desirably should exhibit an overall attractive structural strength and durability. To help provide for such traits, the foam advantageously should exhibit attractive adhesion properties to the facing material and not be particularly susceptible to internal failure, for example tearing.

The adhesion of foam to a facing material can be enhanced by pretreatment of the facing material using generally known methods including corona treatment. Alternatively, enhanced adhesion properties may be obtained by selection of the materials used to prepare the polyurethane foam. Patent publication EP-A-462,438 discloses the use of certain urethane-modified polyisocyanates when preparing water-blown rigid polyurethane foam exhibiting improved adhesion properties to a solid surface, notably metal. Further improvement of the disclosed adhesion properties would be desirable to better meet the demanding industrial performance requirements. Additionally, it would be desirable to develop a foaming process wherein an article comprising a facing material and a rigid polyurethane foam can be prepared under more convenient processing conditions including, for example, a lower process temperature without substantial loss of adhesion properties.

SUMMARY OF THE INVENTION

In one aspect, this invention relates to a process for preparing a rigid polyurethane foam by contacting under reaction conditions a urethane-modified polyisocyanate with a polyahl in the presence of a blowing agent characterized in that:

a) the urethane-modified polyisocyanate has an isocyanate content of from about 10 to about 29 weight percent and is the reaction product of a polymethylene polyphenylisocyanate having an average isocyanate functionality of from about 2.5 to about 3.5 with a polyoxyalkylene polyol having a molecular weight of at least 2000 and an oxyethylene content of at least 35 weight percent;

b) the blowing agent comprises from about 1 to about 10 parts of water per 100 parts by weight of polyahl and is free of any perhalogenated hydrocarbon, with the exception of perfluoroalkanes, wherein the urethane-modified polyisocyanate is present in an amount to provide from about 0.7 to about 2 isocyanate groups per isocyanate-reactive hydrogen atom present from the polyahl and water.

In another aspect, this invention relates to a process for preparing a laminate comprising a facing material having contiguous to it a rigid polyurethane foam obtained by contacting under reaction conditions a urethane-modified polyisocyanate with a polyahl in the presence of a blowing agent, according to the first mentioned process, to provide a polymerizing mixture wherein the polymerizing mixture is brought into contact with the facing material, having a temperature of from about 15° C. to about 60° C. and then permitted to terminate its polymerization reaction.

In yet another aspect, this invention relates to a rigid polyurethane foam or laminate therewith obtained according to the above mentioned process.

In yet another aspect, this invention relates to a two component rigid polyurethane foam-forming system, suitable for use in the above mentioned process which, based on total weight of (a) and (b) present, comprises:

a) from about 25 to about 75 weight percent of a urethane-modified polyisocyanate that has an isocyanate content of from about 10 to about 29 weight percent and is the reaction product of a polymethylene polyphenylisocyanate having an average isocyanate functionality of from about 2.5 to about 3.5 with a polyoxyalkylene polyol having a molecular weight of at least 2000 and an oxyethylene content of at least 35 weight percent; and b) from about 75 to about 25 weight percent of an isocyanate-reactive composition containing:

(i) a polyether polyol or a polyester polyol which has a molecular weight of from about 200 to about 15000; and (ii) water in from 1 to about 10 parts per 100 parts by weight of (i).

Polyurethane foam obtained according to this invention exhibits attractive adhesion properties to various facing materials including notably metal, and especially when such foam is prepared in the presence of a blowing agent consisting of water.

DETAILED DESCRIPTION OF THE INVENTION

The urethane-modified polyisocyanate required in the present invention has an isocyanate content of from about 10 to about 29, preferably from about 20, more preferably from about 22, and preferably up to about 27, more preferably up to about 26 weight percent. The urethane-modified polyisocyanate is the reaction product of a molar excess of polymethylene polyphenylisocyanate with a polyoxyalkylene polyol having a molecular weight of at least 2000 and an oxyethylene content of at least 35 weight percent. The polymethylene polyphenylisocyanate used has an average isocyanate functionality of from about 2.5 to about 3.5, preferably from about 2.7, and preferably up to about 3.2. Suitable polymethylene polyphenylisocyanates include mixtures of polymethylene polyphenylisocyanate with methylene diphenylisocyanate (MDI) including the 4,4'- and 2,4'-MDI isomers. In such mixtures, the polymethylene polyphenylisocyanate typically constitutes from about 95 to about 51, preferably from about 85 to about 55 percent; and the MDI isomers from about 5 to about 49, more preferably from about 15 to about 45 percent based on total weight of the mixture. The ratio of the 4.4' to 2.4'-MDI typically is from about 100:0 to about 50:50, and more usually from about 98:2 to about 60:40. Exemplary of suitable polymethylene polyphenylisocyanates include those designated by the trademark VORANATE such as VORANATE M580 and especially VORANATE M220, available from The Dow Chemical Company, understood to have an isocyanate functionality of about 2.7 and to contain about 60 weight percent polymethylene polyphenylisocyanate and about 40 weight percent MDI, predominantly 4,4'-MDI.

As mentioned, the polyoxyalkylene polyol used to prepare the urethane-modified polyisocyanate has a molecular weight of at least 2000 and an oxyethylene content of at least 35 weight percent. The molecular weight of the polyoxyalkylene polyol preferably is from at least 3000, more preferably from at least 4000, and up to about 15000, more preferably up to about 12000, and yet more preferably up to about 10000. To provide for a resulting foam with attractive adhesion properties the oxyethylene content of the polyoxyalkylene polyol preferably is from at least 50, and more preferably from about 55 to about 95, and yet more preferably from about 55 to about 85 weight percent. In a highly preferred embodiment of the invention, the polyoxyalkylene polyol has a molecular weight of from about 4500 to about 12000 and an oxyethylene content of from about 55 to about 80 weight percent. The balance of the molecular weight of the polyol when not derived from the oxyethylene content is normally attributed to the initiator and other oxyalkylene units as present including oxybutylene, oxytetramethylene, and particularly oxypropylene. The polyoxyalkylene polyol advantageously has an average of from at least 2, preferably from at least 3, and preferably up to about 8, more preferably up to about 7 hydroxyl groups molecule. In a preferred embodiment, the molecular weight of the polyol is such to provide a hydroxyl equivalent weight of at least 1000, and preferably from about 1000 to about 3500, and more preferably from about 1500 to about 2500. Suitable polyoxyalkylene polyols can be obtained by reacting ethylene oxide, and optionally other alkylene oxides including propylene oxide, with initiators such as water, glycerine, α-methylglucoside, α-(2-hydroxyethyl)glucoside, sorbitol or sucrose. Exemplary of suitable commercially available polyoxyalkylene polyols! include those designated by the trademark VORANOL such as VORANOL CP 1421 of The Dow Chemical Company. Equally suitable polyoxyalkylene polyols for preparation of the urethane-modified polyisocyanate include the glycerine initiated polyoxyethylene-oxypropylene adducts having an oxyethylene content of from about 40 to about 68 weight percent and a hydroxyl equivalent weight of from about 2200 to about 3500, as disclosed in U.S. Pat. No. 5,114,989.

The urethane-modified polyisocyanate may be prepared using conditions that have already been described in the prior art such as, for example, EP-A-320,134, EP-A-344,551 and U.S. Pat. No. 5,114,989.

In the present invention, the above described urethane-modified polyisocyanate is reacted with a polyahl in the presence of a blowing agent and optionally other additives. The polyahl used in the process of this invention is an isocyanate-reactive substance which can be an amine-terminated polyoxyalkylene, a polyol, or preferably a polyether polyol, or a polyester polyol, or mixtures thereof. Particularly suitable are polyester and especially polyether polyols having a molecular weight of from about 200 to about 15000. Such polyester and polyether polyols typically will contain an average of at least 2, and up to 8 hydroxyl groups/molecule. Preferred polyahls are the polyether polyols. The presence of polyether polyols equivalent to the polyoxyalkylene polyol as required for the urethane-modified polyisocyanate is not excluded though preferred are polyether polyols as typically used in the production of rigid polyurethane foam and having a molecular weight of from about 200 to about 2000, preferably from about 250 to about 1500. Examples of these and other suitable isocyanate-reactive materials are described more fully in U.S. Pat. No. 4,394,491, particularly in columns 3–5 thereof. Exemplary of suitable commercially available polyether polyols include those designated by the trademark VORANOL such as VORANOL RN411, VORANOL RN490, VORANOL RA640, VORANOL CP260, VORANOL CP450, VORANOL P1010 and VORANOL CP1055, from The Dow Chemical Company.

Optionally, in addition to the above mentioned polyester and polyether polyols the polyahl may also comprise chain extending or cross linking agents of molecular weight less than about 200, and typically from about 60 to about 180. Such agents include for example (di)ethylene glycol, (di)propylene glycol, glycerine, trimethylolpropane and alkanolamines including (di)ethanolamine or (di)propanolamine. When present such agents generally Constitute from more than 3 and up to about 25, and usually from about 4 to about 15 weight percent of the total weight of polyahl present.

The blowing agent comprises from about 1 to about 10 parts of water per 100 parts by total weight of polyahl and is free of any perhalogenated hydrocarbon, with the possible exception of perfluoroalkanes. The water preferably is present in from about 1.5 to about 8, and more preferably from about 2 to about 8 parts per 100 parts by total weight of polyahl. In a highly preferred embodiment of the invention, the blowing agent consists only of water. In a less preferred embodiment, water may be used in combination with one or more physical blowing agents including aliphatic hydrocarbons such as pentane, cyclopentane, hexane and cyclohexane; hydrogen-containing chlorofluorocarbons such as dichlorotrifluoroethane and dichlorofluoroethane; and polyfluorocarbons such as tetrafluoroethane, decafluoropentane or dodecafluorohexane. In any event, advantageously the blowing agent is present in amount to provide the resulting foam with a free rise density of from about 15 to about 200, preferably from about 20 to about 150, more preferably from about 20 to about 100, and more preferably from about 25 to about 50 kg/m$^3$.

In addition to the foregoing critical components, it is often desirable to employ certain other ingredients when preparing the polyurethane foam. Among these additional ingredients are catalysts, surfactants, preservatives, colorants, antioxidants, reinforcing agents, fillers, and phosphorus-containing compounds which may function as adhesion promoters or flame retardants. In making polyurethane foam, it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, from about 0.2 to about 5 parts of surfactant per 100 parts by weight polyahl is sufficient for this purpose.

One or more catalysts for the reaction of the polyahl or water with the polyisocyanate are advantageously used. Suitable catalysts include tertiary amine compounds and organometallic compounds. Exemplary tertiary amine compounds include N-methylmorpholine, N-cocomorpholine, N-ethylmorpholine, triethylenediamine, pentamethyldiethylenetriamine, tetramethylethylenediamine, dimethylcyclohexylamine, 1-methyl-4-dimethylaminoethylpiperazine, 3-methoxy-N-dimethylpropylamine, diethylethanolamine, N,N-dimethyl-N' ,N'-dimethyl isopropylpropylenediamine, N,N-diethyl-3-diethylaminopropylamine, and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, such as an alkali metal alkoxide, carboxylate, including especially acetate, or quaternary amine salts, may also optionally be employed herein. Such catalysts are used in an amount which measurably increases the rate of reaction of the polyisocyanate. Typical amounts are from about 0,001 to about 3 parts of catalyst per 100 parts by weight of polyahl.

Advantageously phosphorus-containing compounds may be present in an amount sufficient to impart a desired degree of flame retardancy to the foam. Typically such compounds are present in at least 4, preferably from about 5 to about 20, and more preferably from about 7 to about 15 parts per 100 parts by total weight of polyahl present. Suitable phosphorus-containing compounds for the purpose of flame retardancy include tris(chloroethyl)phosphate (TCEP), tricresylphosphate, tris(chloropropyl)phosphate TCPP), triethylphosphate (TEP), dimethylmethyl phosphonate (DMMP) and diethylethyl phosphonate (DEEP). Use of halogen-free phosphorus-containing compounds is preferred as this can reduce hazards associated with combustion products.

Certain phosphorus-containing compounds have been observed to promote adhesion and cohesion properties of the foam and advantageously are present. Such compounds include cyclic organophosphorus-containing compounds including 1-alkyl, or aryl -1-oxophospholene and -1-thiophospholene compounds. Exemplary and preferred of such cyclic organophosphorus compounds include 1-methyl-1-oxophospholene, 1-ethyl-1 -oxophospholene, 1-propyl-1-oxophospholene, or mixtures thereof. Advantageously, the cyclic phosphorus-containing compound is present in a quantity up to about 5.0, preferably up to about 4.0 and more preferably up to about3.0, and advantageously from at least 0.05, preferably at least 0.1 and more preferably at least 0.2 weight percent based on total weight of polyahl(s). Other known adhesion promoting substances such as cyclic amide compounds including N-methyl pyrrolidinone may also be present. Mixtures of phosphorus-containing compounds for the purpose of promoting flame retardancy and foam adhesion may be present in the foaming process.

To prepare polyurethane foam according to the present invention, the urethane-modified polyisocyanate, polyahl, blowing agent, and other optional additives are brought together at a temperature of from about 15° C. to and up to about 60° C., preferably from about 20° C. to about 40° C. and more preferably from about 20° C. to about 30° C. and permitted to polymerize. The urethane-modified polyisocyanate is present in an amount to provide from about 0.7 to about 2, preferably from about 0.9 to about 1.5, and more preferably from about 1.1 to about 1.4 isocyanate group per isocyanate-reactive hydrogen atom present from the polyahl and water. The mixing apparatus and various types of mixing head and spray apparatus as conveniently used may be employed herein. It is often convenient, but not necessary, to preblend certain of the raw materials prior to reacting the polyisocyanate and polyahl. For example, it is often useful to blend the polyahl(s), blowing agent, surfactants, catalysts and other components except for polyisocyanates, and then contact this mixture with the polyisocyanate composition. Alternatively, all components can be introduced individually to the mixing zone where the polyisocyanate composition and polyahl(s) are contacted. Suitable procedures for the preparation of polyurethane foams are discussed in U.S. Pat. Nos. RE 24,514 and 3,821,130, and G.B. Patent 1,523,528.

As mentioned in one aspect, this invention relates to a process for preparing a laminate article comprising a facing material having contiguous to it a rigid polyurethane foam prepared as above described. In such a process the above described urethane-modified polyisocyanate, polyahl blowing agent and other optional additives are first brought together to give a polymerizing mixture which is then subsequently brought into contact with the facing material and permitted to terminate its polymerization reaction. To assist in termination of the polymerization reaction and promote optimum adhesion properties of foam to facing material, it is found advantageous to provide the facing material with a temperature of from about 15° C. to about 60° C., preferably from about 20° C., more preferably from about 25° C., and preferably up to about 45° C., more preferably up to about 35° C.

The selection of the facing material is in accordance with suitability for its intended end application and can be a plastic resin, a cellulose-based material, a lignocellulose-based material or a metal sheet or foil. The polyurethane foam obtained as described hereinabove is observed to have attractive adhesion properties to notably metal surfaces and accordingly particularly suited to the manufacture of laminate articles comprising a metal facing material. The metal may be a metal sheet or metal foil of, for example, aluminum but preferably is steel. The average thickness of the metal sheet or foil is dependent on the application but typically will range from about 0.001 to about 10, usually from about 0.1 to about 5, and more usually from a bout 0.2 to about 1.5 millimeters. Optionally, the surface of the metal which is to be in contact with the foam may be pretreated to enhance the adhesion between the foam and metal.

As mentioned in another aspect, this invention is a two component polyurethane foam-forming system which comprises: (a) a urethane-modified polyisocyanate as described hereinabove; and (b) a polyahl composition. The polyahl composition comprises a polyahl as described hereinabove, and water in from about 1 to about 10 parts per 100 parts by weight of polyahl. Component (a) is present in from about 25 to about 75, preferably from about 35 to about 65 percent; and component (b) in from about 75 to about 25, preferably from about 65 to about 35 percent, based on total weight of components (a) and (b).

SPECIFIC EMBODIMENTS OF THE INVENTION

The invention is illustrated by the following examples in which all parts and percentages are by weight, unless otherwise stated. Where reported, properties of foams as obtained are observed according to the following test procedures; tensile strength—DIN 53292.

EXAMPLE 1 TO 13

A number of urethane-modified polyisocyanate compositions are prepared according to the following general procedure.

An excess of Isocyanate A is reacted at a temperature of about 45° C. to 60° C. with a given polyol; the resulting crude urethane-modified polyisocyanate is stabilized by addition of a trace amount of benzoyl chloride. Quantities of reacting components and characterizing data of the urethane-modified polyisocyanate so obtained are given in Table 1.

Iso. A—VORANATE M220, a polymethylene polyphenyl-isocyanate mixture with an NCO content of about 31.6 wt %, average functionality of about 2.7, and containing about 40 wt % methylene diphenylisocyanate isomers, available from The Dow Chemical Company.

Polyol A—VORANOL P400, a 400 molecular weight polyoxypropylene diol, available from The Dow Chemical Company.

Polyol B—VORANOL P1010, a 1000 molecular weight polyoxypropylene diol, available from The Dow Chemical Company.

Polyol C—VORANOL P2000, a 2000 molecular weight polyoxypropylene diol, available from The Dow Chemical Company.

Polyol D—VORANOL EP-1900, a 3800 molecular weight polyoxypropylene-oxyethylene diol (20 wt % oxyethylene), available from The Dow Chemical Company.

Polyol E—VORANOL E400, a 400 molecular weight polyoxyethylene diol, available from The Dow Chemical Company.

Polyol F—VORANOL CP1000, a 1000 molecular weight polyoxypropylene triol, available from The Dow Chemical Company.

Polyol G—VORANOL CP3001, a 3000 molecular weight polyoxypropylene-oxyethylene triol (10 wt % oxyethylene), available from The Dow Chemical Company.

Polyol H—VORANOL CP4702, a 4800 molecular weight polyoxypropylene-oxyethylene triol (18 wt % oxyethylene), available from The Dow Chemical Company.

Polyol J—VORANOL CP6001, a 6000 molecular weight polyoxypropylene-oxyethylene triol (14 wt % oxyethylene), available from The Dow Chemical Company.

Polyol K—An experimental polyoxyethylene-oxypropylene triol (75 wt % oxyethylene; randomly distributed) 3with molecular weight of 1000.

Polyol L—VORANOL CP1421, a 5000 molecular weight polyoxypropylene-oxyethylene triol (75 wt % oxyethylene), available from The Dow Chemical Company.

Polyol M—An experimental polyoxyethylene-oxypropylene triol (68 wt % oxyethylene; randomly distributed) with molecular weight of 7800.

Polyol N—An experimental polyoxyethylene-oxypropylene polyol (68 wt % oxyethylene; randomly distributed) with molecular weight of 12000 obtained from an carbohydrate initiator mixture which has an average hydroxyl functionality of 6.9.

The so prepared urethane-modified polyisocyanate composition are used to prepare a laminate comprising a steel facing sheet and contiguous to said sheet a polyurethane foam. The polyisocyanate is intimately mixed width the below given polyahl composition in an amount to provide for an isocyanate reaction index of 130 and the resulting reacting mixture poured in to a mold thermostated to 20° C. and having dimensions of 200×200×40 mm, which is then subsequently closed. One face of the mold contains a steel facing of thickness of about 1 mm. The amount of reacting mixture poured into the mold is sufficient to provide for a molded foam having an overall molded density of about 70 kg/m$^3$. The laminate comprising metal facing and molded polyurethane foam is removed from the mold after 15 minutes.

| Polyahl Composition: | |
|---|---|
| 32.5 parts | VORANOL RN482, a sorbitol -initiated oxypropylene polyol with a molecular weight of about 700, available from The Dow Chemical Company. |
| 62 parts | VORANOL CP1055, a 1000 molecular weight polyoxypropylene triol, available from The Dow Chemical Company. |
| 1 part | a 50:50 wt blend of silicon-based surfactants TEGOSTAB B1048 and B8427 available from Th Goldschmidt AG. |
| 1.05 parts | Catalyst mixture containing CURITHANE 206, a proprietary amine-based trimerization catalyst available from The Dow Chemical Company; NIAX A1 a proprietary amine-based catalyst available from Union Carbide Corp; and N,N-dimethylcyclohexylamine, present in a weight ratio of 12:8:1. |
| 3.5 | water |

Properties, where observed, for the resulting foam are also given in Table 1. With reference to the "Saw test" the percentage value provides an indication of the number of laminate articles which broke at the foam/metal interface when being cut. A low percentage value or zero is indicative of a foam exhibiting strong adhesion to the metal. A foam exhibiting a high tensile strength is indicative of a product having attractive cohesive properties and less susceptible to internal stress-strain failure.

The reported data indicates demonstrates that use of urethane-modified polyisocyanates which are adducts of polyoxyalkylene triols result in better tensile strengths of the resulting foam than when using urethane-modified polyisocyanates which are adducts of polyoxyalkylene diols, as does use of polyoxyalkylene diols or triols having a higher molecular weight. When using urethane-modified polyisocyanates which are adducts of polyoxyalkylene polyols that have a significant oxyethylene content, the resulting foams exhibit an unexpectedly superior tensile strength. This is particularly well illustrated by Example 11 in comparison to Examples 8 or 9 which relate to urethane-modified polyisocyanates that are adducts of polyoxyalkylene triol having a similar molecular weight but a substantially lower oxyethylene content.

EXAMPLE 14

Individual molded polyurethane foam laminates are prepared as described for Example 13, only in this case the mold temperatures are respectively 20° C., 30° C., 35° C., 40° C. and 45° C. The maximum observed tensile strengths for the resulting foam are observed to be:

20° C. Foam; 287 kPa

30° C. Foam; 290 kPa

35° C. Foam; 470 kPa

40° C. Foam; 450 kPa

45° C. Foam; 430 kPa.

Optimum tensile strength is observed at a process temperature in the range of 30° C. to 35° C.

TABLE 1

|  | Example 1* | Example 2* | Example 3* | Example 4* | Example 5* | Example 6* | Example 7* |
|---|---|---|---|---|---|---|---|
| VORANATE M220 (pbw) | 2000 | 2000 | 2000 | 2000 | 2000 | 2000 | 2000 |
| Polyol (Type/pbw) | A/214 | B/292 | C/333 | D/356 | E/212 | F/263 | G/330 |
| Molecular weight | 400 | 1000 | 2000 | 3800 | 400 | 1000 | 3000 |
| Equivalent weight | 200 | 500 | 1000 | 1900 | 200 | 333 | 1000 |
| wt % EO:PO | 0:100 | 0:100 | 10:100 | 20:80 | 100:0 | 0:100 | 110:90 |
| NCO % of Polyisocyanate | 25.5 | 25.0 | 25.4 | 25.4 | 26.3 | 25.6 | 25.3 |
| Viscosity of Polyisocyanate (cSt at 25° C.) | 2560 | 2040 | 972 | 852 | 2088 | 2280 | 1092 |
| Foam Tensile Strength (kPa) | / | 35 | 97 | 134 | / | / | 145 |
| Saw Test, % failure | 100 | 77 | 55 | 55 | 100 | 100 | 77 |

|  | Example 8* | Example 9* | Example 10* | Example 11 | Example 12 | Example 13 |
|---|---|---|---|---|---|---|
| VORANATE M220 (pbw) | 2000 | 2000 | 2000 | 2000 | 2000 | 2000 |
| Polyol (Type/pbw) | H/349 | J/356 | K/263 | L/349 | M/361 | N/324 |
| Molecular weight | 4800 | 6000 | 1000 | 5000 | 7800 | 12000 |
| Equivalent weight | 1600 | 2000 | 333 | 1666 | 2600 | 1740 |
| wt % EO:PO | 18:82 | 18:82 | 75:25 | 75:25 | 68:32 | 68:32 |
| NCO % of Polyisocyanate | 25.7 | 24.0 | 25.4 | 25.2 | 25.5 | 25.3 |
| Viscosity of Polyisocyanate (cSt at 25° C.) | 996 | 1140 | / | 1092 | 1140 | 1120 |
| Foam Tensile Strength (kPa) | 132 | 143 | / | 243 | 207 | 287 |
| Saw Test, % failure | 39 | 0 | 100 | 0 | 0 | 0 |

*Not an example of this invention

What is claimed is:

1. A process for preparing a rigid polyurethane foam by contacting under reaction conditions a urethane-modified polyisocyanate with a polyahl in the presence of a blowing agent characterized in that:

a) the urethane-modified polyisocyanate has an isocyanate content of from about 10 to about 29 weight percent and is the reaction product of a polymethylene polyphenylisocyanate having an average isocyanate functionality of from about 2.5 to about 3.5 with a polyoxyalkylene polyol having a molecular weight of at least 2000 and an oxyethylene content of at least 50 weight percent;

b) the blowing agent comprises from about 1 to about 10 parts of water per 100 parts by weight of polyahl and is free of any perhalogenated hydrocarbon, with the exception of perfluoroalkanes, wherein the urethane-modified polyisocyanate is present in an amount to provide from about 0.7 to about 2 isocyanate groups per isocyanate-reactive hydrogen atom present from the polyahl and water.

2. The process of claim 1 wherein the urethane-modified polyisocyanate is the reaction product of a polyoxyalkylene polyol which has at least 3 hydroxyl groups/molecule and a molecular weight of at east 3000.

3. The process of claim 2 wherein the polyoxyalkylene polyol has a molecular weight of from about 4000 to about 12000 and an oxyethylene content of at least 50 weight percent.

4. The process of claim 3 wherein the blowing agent consists of water.

5. The process of claim 1 wherein the polyahl is selected from the group consisting of an amine-terminated polyoxyalkylene, a polyether polyol, and a polyester polyol.

6. The process of claim 5 wherein the polyahl is a polyether polyol or a polyester polyol which has a molecular weight of from about 200 to about 15000.

7. The process of claim 1 wherein:

a) the urethane-modified polyisocyanate has an isocyanate content of from about 22 to about 27 weight percent and is the reaction product of a polymethylene polyphenylisocyanate having an average isocyanate functionality of from about 2.7 to about 3.2, with a polyoxyalkylene polyol that has a molecular weight of from about 4000 to about 12000 and an oxyethylene content of at least 50 weight percent; with b) the polyahl is a polyether polyol or a polyester polyol which has a molecular weight of from about 200 to about 15000; and c) the blowing agent consists of from about 2 to about 8 parts of water per 100 parts by weight of (b).

8. The process of claim 1 which further comprises a phosphorus-containing compound.

9. The process of claim 8 wherein the phosphorus-containing compound, is a halogen-free compound selected from the group consisting of tricresylphosphate, triethylphosphate (TEP), dimethylmethyl phosphonate (DMMP) and diethylethyl phosphonate (DEEP).

10. The process of claim 8 wherein the phosphorus-containing compound, is a cyclic organophosphorus compound selected from the group consisting of 1-methyl-1- oxophospholene, 1-ethyl-1-oxophospholene and 1-propyl-1-oxophospholene.

11. The process of claim 10 wherein further present is a halogen-free phosphorus-containing compound selected from the group consisting of tricresylphosphate, triethylphosphate (TEP), dimethylmethyl phosphonate (DMMP) and diethylethyl phosphonate (DEEP).

12. A rigid polyurethane foam obtained according to the process of claim 1.

13. A rigid polyurethane foam obtained according to the process of claim 7.

14. A rigid polyurethane foam obtained according to the process of claim 8.

15. A two component rigid polyurethane foam-forming system consisting of components (a) and (b), suitable for use in the process of claim 1, which based on total weight of (a) and (b) present, contains:

as component (a), from about 29 to about 75 weight percent of a urethane-modified polyisocyanate that has an isocyanate content of from about 10 to about 29 weight percent and is the reaction product of a polymethylene polyphenylisocyanate having an average isocyanate functionality of from about 2.5 to about 3.5 with a polyoxyalkylene polyol having a molecular weight of at least 2000 and an oxyethylene content of at least 50 weight percent; and as component (b), from about 75 to about 25 weight percent of an isocyanate-reactive composition containing:

(i) a polyether polyol or a polyester polyol which has a molecular weight of from about 200 to about 15000; and (ii) water in from 1 to about 10 parts per 100 parts by weight of (i).

* * * * *

UNITED STATES PATENT AND TRADEMARK OFFICE
CERTIFICATE OF CORRECTION

PATENT NO : 5,494,942

DATED : February 27, 1996

INVENTOR(S) : Andreas Ottens; Peter Keller; Ulrich Müller

It is certified that error appears in the above-identified patent and that said Letters Patent is hereby corrected as shown below:

Claim 1, column 9, line 40, following presence delete ":"

Signed and Sealed this

Sixth Day of February, 2001

*Attest:*

*Attesting Officer*

Q. TODD DICKINSON
*Director of Patents and Trademarks*